United States Patent [19]

Pollak

[11] 3,837,590
[45] Sept. 24, 1974

[54] CABLE REEL ASSEMBLY

[75] Inventor: Edward George Pollak, York, Maine

[73] Assignee: Johns-Manville Corporation, Denver, Colo.

[22] Filed: June 26, 1972

[21] Appl. No.: 266,196

[52] U.S. Cl. ........ 242/54 R, 114/206 R, 242/100.1, 242/117
[51] Int. Cl. ........................ B65h 75/02, B63b 21/52
[58] Field of Search ............. 242/117, 100.1, 100.2, 242/107.1, 107.11, 107.12, 107.13, 54 R; 114/206 R

[56] References Cited
UNITED STATES PATENTS

| | | | |
|---|---|---|---|
| 2,206,174 | 7/1940 | Falk | 242/100.1 X |
| 3,295,489 | 1/1967 | Bossa | 114/206 R |
| 3,584,745 | 6/1971 | Wrightson | 242/100.1 |

*Primary Examiner*—George F. Mautz
*Attorney, Agent, or Firm*—John A. McKinney; Robert M. Krone; James W. McClain

[57] ABSTRACT

A cable reel assembly is disclosed herein and includes two outer cable support drums and a center cable support drum coaxially positioned around a common axle and between two, preferably spoked, annular reel frames also positioned coaxially around the common axle. The center drum, which is preferably of greater diameter than the outer drums, is separated from the outer drums by a pair of circumferential dividers positioned between the three drums. The assembly also includes three cables, each of which is connected at one end to a common cable connector having an elongated portion adapted to sit unconnected in a slot provided in the center drum. The dividers also include slots which are aligned with the center drum slot and which receive opposite end sections of the elongated connector portion. In this manner, the three cables can be wound around respective support drums without interferring with one another. Constructed in this fashion, the reel of the assembly will completely disconnect itself from the arrangement of interconnected cables after the latter have been unwound therefrom. Hence, the assembly is quite suitable for anchoring an object such as, for example, a buoy, where the cable would otherwise provide an undesirable drag to the anchor.

10 Claims, 10 Drawing Figures

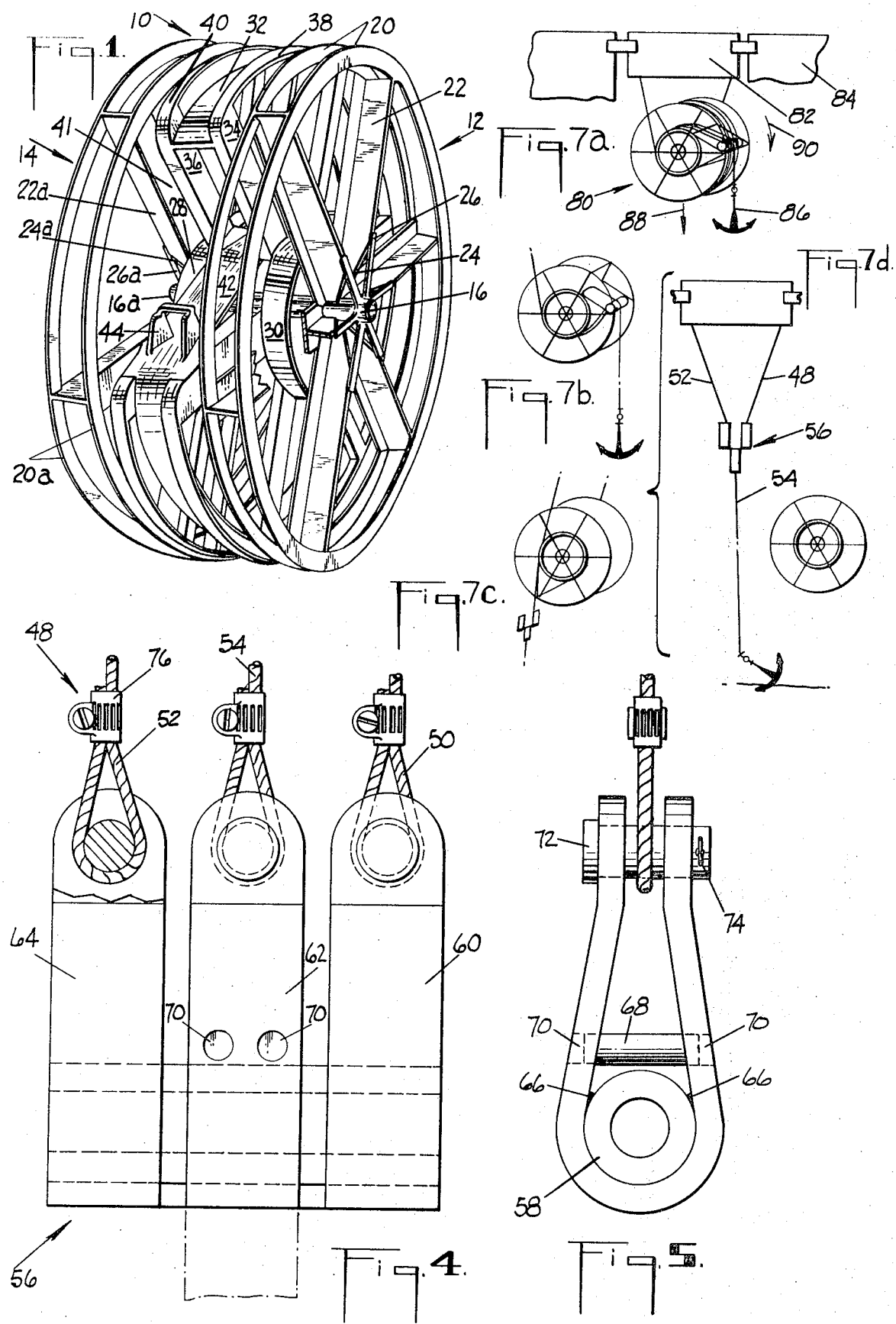

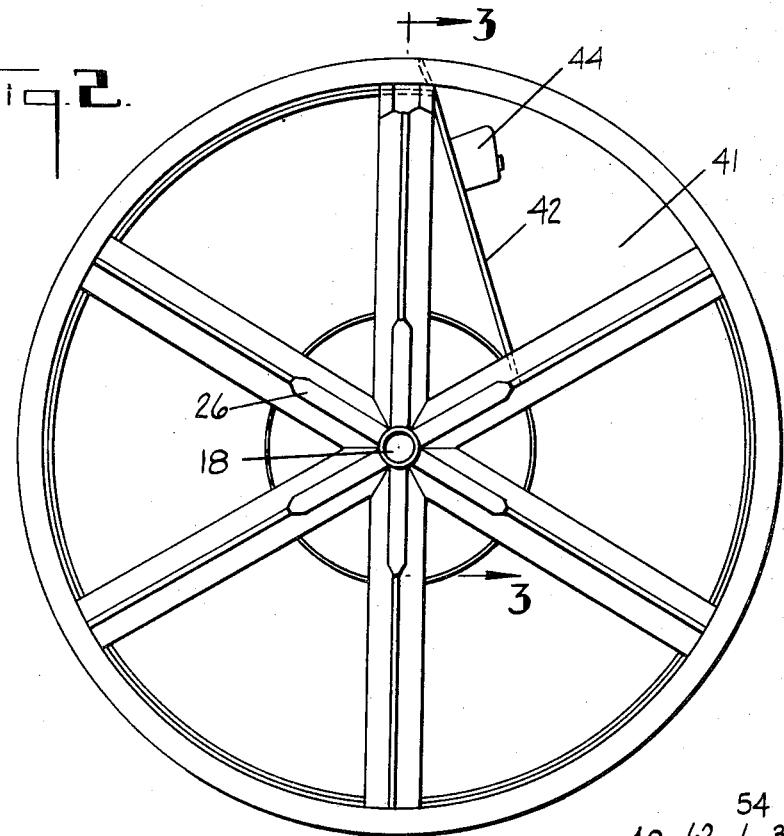
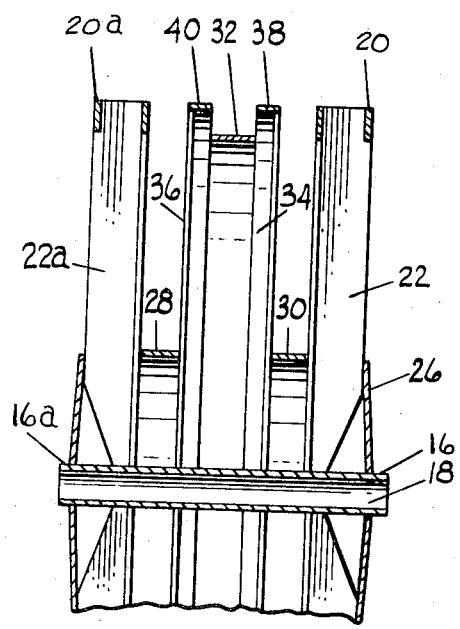
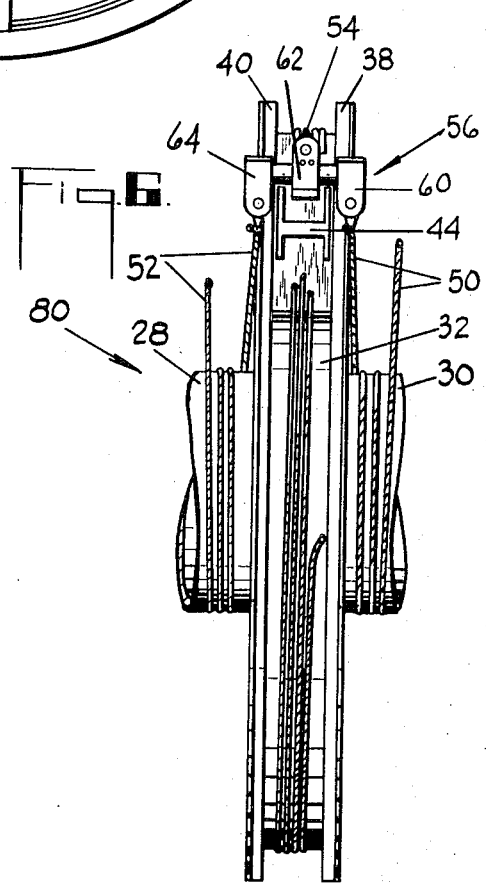

CABLE REEL ASSEMBLY

BACKGROUND OF THE INVENTION

1. Field of the Invention

The present invention is directed generally to cable reels and more particularly to a cable reel assembly suitable for use in anchoring an object such as a buoy in a body of water. The invention herein described was made in the course of or under a contract or subcontract thereunder, with the Unitd States Coast Guard.

2. Description of Prior Art

Heretofore, most objects have been anchored in a body of water by tying one end of a cable to the object to be anchored, tying the other end of the cable to an anchor and dropping the anchor into the water. While this method is quite satisfactory for anchoring one's boat or a small buoy in shallow water, it has not been found to be satisfactory where objects to be anchored in deeper water require greater lengths of heavy cable. For example, for confining oil slicks, the Coast Guard quite often utilizes a 9/16th inch diameter stainless steel cable in deploying buoys out in the deeper areas of the ocean. The cables must be of sufficient length to allow the anchor to reach the ocean floor.

The particular cable described above or similar cable is extremely stiff and, when used in great length, it is extremely hard to handle. Hence, to conventionally drop anchor utilizing great lengths of this particular type of cable would be a difficult task. Practically speaking, the best way to handle this type and length of cable is to wind it around a reel. A conventional one drum reel could adequately be used in, for example, anchoring down a boat if the reel could be mounted thereto without regard to its size or weight, since a rather large and heavy reel would be required. However, where the reel is dropped into the body of water and the cable is unwound from the reel by its own inertia, which would be required in, for example, deploying buoys, a conventional reel would not be practical.

Anchoring an object by utilizing the aforedescribed method of dropping the entire cable would reel into the body of water produces many problems such as, for example, the tendency of the cable or cables to tangle with itself, with each other and/or with the anchor. Another problem is that once the buoy or other such object is anchored, the reel, which is attached to the cable, combines with the undercurrents to produce an undesirable drag, in many cases, causing the object to be displaced. Hence, to use this method, an especially designed reel is required. As will be seen hereinafter, the present invention provides such a reel.

OBJECTS OF THE INVENTION

In accordance with the foregoing, an object of the present invention is to provide a novel three-cable reel assembly which is designed to minimize cable tangling when the cables are unwound from the reel.

Another object of the present invention is to provide a novel three-cable reel assembly which is designed so that the reel automatically completely disconnects itself from the cable when the latter are unwound from the reel.

Still another object of the present invention is to provide a novel three-cable reel assembly which is especially useful in anchoring an object in a body of water.

A further object of the present invention is to provide a novel method of anchoring an object in a body of water.

These and other objects and features of the present invention will become apparent from the following descriptions.

DESCRIPTION OF THE DRAWINGS

FIG. 1 is a perspective view of a cable reel constructed in accordance with the present invention.

FIG. 2 is a side elevational view of the reel illustrated in FIG. 1.

FIG. 3 is a side elevational view of a portion of the reel illustrated in FIG. 1.

FIG. 4 is a front elevational view of a three-cable connector arrangement constructed in accordance with the present invention.

FIG. 5 is a side elevational view of the connector arrangement illustrated in FIG. 4.

FIG. 6 is a perspective view illustrating how the arrangement of FIG. 4 is wound around the reel of FIG. 1.

FIG. 7 is a series of four schematic views, designated 7a through 7d, illustrating how a cable is unwound from the reel of FIG. 1, and how the latter is released from connection with the cable.

DETAILED DESCRIPTION

The present invention is directed to a novel three-cable reel assembly which, as will be seen hereinafter, is especially suitable for use in anchoring objects such as buoys in a body of water. The assembly includes three cable support drums disposed around a common axle and two annular dividers positioned on opposite sides of and extending outwardly from the center drum so as to separate the three support drums from one another. For reasons to be set forth hereinafter, the center support drum and the two dividers include inwardly directed aligned slots extending across an entire outer peripheral portion of each thereof.

The reel assembly also includes three cables two of which have common ends connected to opposite end sections of an elongated cable connector and the third of which has one end connected to an intermediate portion of the cable connector. The connector is positioned within the aligned slots of the aforedescribed reel but completely unconnected therefrom so that opposite ends of the cable connector extend slightly beyond the annular dividers. In this manner, the center cable can be wound around the center drum and over the cable connector for holding the latter in place. The outer cables, in a similar manner, are wound around the outer cable support drums with preferably the same number of turns as the center cable.

In accordance with a preferred method of using the aforedescribed cable reel assembly, an anchor is tied to the free end of the center cable and a buoy or other buoyant object to be anchored is fastened to the free ends of the outer cables. The entire cable is then dropped into the body of water causing the reel and cables including the anchor to descend therein. During descent, the reel, by gravitational force, spins about its axle causing all three cables to simultaneously unwind from their respective support drums. Because the three cables are initially wound to the reel with equal number of turns, the cables will completely unwind at the same time, thereby allowing the reel to completely disconnect itself from the cables. This, of course, eliminates any possible undesirable obstruction that the reel might otherwise cause to the anchor line.

From the foregoing, it should be apparent that the three-cable reel assembly of the present invention provides an uncomplicated and reliable method for anchoring an object such as a buoy, especially where great lengths of heavy duty cables are required in the operation. Another feature which is brought about by the reel assembly of the present invention is that it makes retrieval of the anchor and cables relatively simple since the cables can be easily rewound around a reel. These features and other features of the present invention will become more apparent from the following descriptions of the drawings.

Turning now to the drawings, wherein like components are designated by like reference numerals throughout the various figures, a cable reel, constructed in accordance with the present invention, is illustrated in FIGS. 1 to 3 and generally designated by the reference numeral 10. The reel includes a pair of preferably identical outer support wheels 12 and 14. As illustrated in FIG. 1, the support wheel 12 includes a hub 16 which comprises one end section of a common hollow axle 18 (see FIG. 3), a pair of axially spaced apart rims 20 and a plurality of spokes 22 connecting the hub with the rims.

Each spoke 22 is preferably a T-bar having its leg portion extending parallel with the axle 18 and between the two rims 20 and its cross bar portion extending in the same plane as the inner rim 20. As will be seen hereinafter, this particular design is quite advantageous when the reel is used in the aforedescribed anchoring operation. Specifically, when the reel is dropped into the water, it sometimes tends to spin at too great a rate causing tangling of the cables. The T-bar construction of the spokes produces a drag to the reel for slowing it down to a desirable rate.

As illustrated best in FIG. 1, the hub connecting end of each spoke 22 is beveled at one corner 24. This facilitates welding or otherwise securing the spoke to the hub. However, in order to strengthen this inner connection, strengthening bars 26 are welded or suitably fastened at opposite ends to the hub and each spoke, as illustrated in FIG. 1.

As stated above, support wheel 14 is preferably identical to support wheel 12. Hence, like components of support wheels 12 and 14 will be designated by like reference numerals, the suffix letter a being utilized to designate those components of wheel 14. The hub 16a of wheel 14, of course, comprises the otherwise free end section of common axle 18.

While the support wheels 12 and 14 are preferably of the aforedescribed design, this particular design is not absolutely necessary to the operation of cable reel assembly 10, especially when the assembly is not being used to anchor objects in a body of water. The support wheels could be, for example, solid in structure.

Cable reel 10 also includes three cable support drums, two outer drums 28 and 30 and a center drum 32, which are positioned between the support wheels 12 and 14 and concentrically around axle 18. As illustrated best in FIGS. 1 and 3, the center cable support drum 32 is connected with axle 18 by a plurality of spokes 34 positioned on one side of the center drum and a plurality of spokes 36 positioned on the other side of the center drum. The outer drum 30 is positioned between and suitably fastened to spokes 22 and 34, as illustrated best in FIG. 2, and outer drum 28 is positioned between and suitably fastened to spokes 22a and 36.

For reasons to be stated hereinafter, the center drum 32 is preferably substantially greater in diameter than the two outer drums 28 and 30 which, as shown best in FIG. 3, are preferably of equal diameter. As also shown in this figure, the spokes 34 and 36 extend radially beyond the cable supporting surface of drum 32 and support at these radially outwardly extending ends two annular dividers 38 and 40, respectively. The dividers separate the center drum 32 from the outer drums 28 and 30 and prevent the cable to be wound around the center drum from slipping off thereof.

As illustrated best in FIGS. 1 and 3, aligned portions of the center drum and dividers are broken away so as to define a slot 41 and a suitably fastened elongated plate 42 is provided. The plate extends inwardly and at an angle from the cable supporting surface of center drum 32 to points on spokes 34 and 36 which are in alignment with the outer drums. A cable connector support 44 comprising two flat plates and interconnecting cross bar is positioned within slot 41 and centrally mounted to plate 42 between the edges of the latter and near the center drum connecting end thereof. As will be seen hereinafter, support 44 is provided for supporting, in an unconnected fashion, a cable connector to be described with respect to FIGS. 4 and 5.

Turning now to FIGS. 4 and 5, attention is directed to a cable arrangement 48 which is constructed in accordance with the present invention and which is utilized with cable reel 10 to form a three-cable reel assembly to be described with respect to FIG. 6. The cable arrangement includes three cables, two outer cables 50 and 52 and a center cable 54, each of which has one end fastened to a cable connector 56 in a manner to be described below. The cable connector includes a pivot pin 58 having an axial length slightly greater than the combined axial length of the center drum 32 and dividers 38 and 40 of reel 10. The connector also includes three substantially U-shaped cable straps 60, 62 and 64, the width of each of which is slightly less than one-third the axial length of pivot pin 58.

As illustrated best in FIG. 5, the pivot pin 58 is disposed within all three cable straps and at the bottom thereof. As shown in FIG. 4, the straps 60 and 64 are positioned around opposite end sections of the pin and strap 62 is positioned around an intermediate portion thereof, leaving a space between the center strap and each outer straps. As will be seen hereinafter (FIG. 6), these spaces are provided to allow the pivot pin to engage directly against the spaced apart plates of the connector support 44. The center strap is allowed to freely pivot around pin 58. However, the two outer straps are preferably tack welded at 66 (FIG. 5) or otherwise suitably fixed to the pivot pin for preventing relative movement therebetween. This not only prevents the outer straps from pivoting relative to the pivot pin but also fixs the latter within all three straps. In addition, in order to further secure the pivot pin within the straps, a pair of dowels 68 may be positioned within the U-shaped center strap 62 just above the pivot pin such that opposite ends of each dowel are disposed within cooperating apertures extending through opposite sides of the center strap. Each of the dowels may be secured in this position in any suitable manner such as, for example, by plug welding as indicated at 70.

Cables 50, 54 and 52 are preferably connected to the ends of cable straps 60, 62 and 64 respectively, by cable connecting pins 72. Specifically, each of these pins extends through a pair of cooperating holes provided at opposite ends of each cable strap. The pins may be held in place by, for example, cotter pins 74. An end portion of each cable is folded over to form an eye and is secured in this position by, for example, the clamp 76. Hence, by positioning the ends of the cables between the ends of corresponding straps and thereafter inserting the pins 22 therethrough, the cables are reliably secured to connector 56.

From the foregoing, it should be apparent that center cable 54 is capable of pivoting from, for example, the position illustrated by solid lines in FIG. 4 to the position illustrated by dotted lines. On the other hand, for purposes of the present invention, the center strap could have been fixed to the pivot pin and the outer straps could have been allowed to pivot about the latter. In fact, while not preferable, all three straps could have been designed to pivot relative to the pin 58.

Turning to FIG. 6, attention is directed to a three-cable reel assembly 80 which comprises the aforedescribed reel 10 and cable arrangement 48. As illustrated, connector 56 of the cable arrangement is positioned on but unconnected to connector support 44 of reel 10 such that the center strap 62 is centrally located with respect to center drum 32 and such that the two outer straps 60 and 64 extend slightly beyond dividers 38 and 40, respectively. Center cable 54 is wound around drum 32 so as to pass over the connector. In this manner, the connector is held in place on support 44. The outer cables 50 and 52 extend down towards respective outer cable support drums 30 and 28 and are wound around the latter, preferably with the same number of turns as center cable 54. Hence, it should be readily apparent that upon simultaneously unwinding the three cables from reel 10 reel 10 will completely release itself from the connector arrangement including connector 56.

Turning to the four views of FIG. 7, attention is directed to a method of utilizing the aforedescribed three-cable reel assembly 80 to anchor a buoy 82 which, for example, may be provided for aiding in the positioning of oil barrier 84 around an oil slick in a body of water. As illustrated diagrammatically in FIG. 7a, the free ends of outer cables 50 and 52 extending from reel 10 are suitably fastened to the buoy and the outwardly extending end of center cable 54 is suitably fastened to an anchor 86. The entire cable reel assembly is dropped into the water whereupon it begins to descend, as illustrated by arrow 88, and simultaneously spin about the axle 18 of the reel, as indicated by arrow 90. In this regard, the anchor is preferably of sufficient weight so as to keep the unwound section of center cable 54 taut during descent of the cable reel assembly. In this manner, the possibility of center cable tangling up with the reel is minimized. In this regard, by providing the aforedescribed T-shaped spokes 22, the rate at which the reel spins during descent is reduced and thereby aids in keeping the unwound portion of the center cable taut.

As the reel spins during its descent, the three cables are simultaneously unwound therefrom, as illustrated in FIG. 7b until, as illustrated in FIGS. 7c and 7d, the reel is completely released therefrom. The reel may be totally discarded and allowed to drop to the water floor or it may be constructed of a suitable material which will allow it to float to the top where it can be retrieved.

As illustrated in FIG. 7d, the center strap 62 of connector 56 has pivoted downward while the outer straps 60 and 64 extend upward so as to provide a straight line path between the anchor and buoy. As also seen in this figure, the center cable 54 is longer than the two outer cables 48 and 52, the latter being equal in length. In this manner, the connector 56 is positioned closer to the buoy 82 and therefor the surface of the water then to the anchor 86, which has been found to be desirable in anchoring the buoy.

In order to have a center cable of greater length than the outer cables while at the same time initially winding the three cables around reel 10 with equal turns, the center drum 32 of the reel, as described with respect to FIGS. 1 to 3, must be proportionately greater in diameter than the two outer drums 28 and 30. More specifically, the outer drums must be sufficiently small in diameter so that the shorter cables can be wound around these drums with a number of turns equal to that of the larger cable. If, on the other hand, it were desirable to have the three cables of equal length, the three drums, of course, would be of equal diameter.

While cable assembly 80 has been described in anchoring a buoy, it to be understood that the assembly is not limited to this specific function. In addition, it is to be understood that variations and modifications of the cable assembly of the present invention may be made without departing from the spirit of the invention and that the scope of the invention is not to be interpreted as limited to this specific embodiment disclosed herein, but rather in accordance with the appended claims when read in light of the foregoing disclosure.

What I claim is:

1. A three-cable reel assembly comprising:
   a. a first cylindrical outer cable support;
   b. a second cylindrical outer cable support coaxial with and spaced from said first support;
   c. a cylindrical center cable support coaxial with, positioned between and connected with said outer supports;
   d. a cable connector including an elongated portion adapted to be positioned against but unconnected to said center cable support and parallel with the axis thereof, said connector portion being of sufficient length to extend beyond opposite edges of said center support;
   e. a first outer cable connected at one end with one end section of said elongated connector portion and being wound around said first outer support;
   f. a second outer cable connected at one end with the other end section of said elongated connector portion and being wound around said second outer support; and
   g. a center cable connected at one end with an intermediate section of said elongated connector portion and being wound around said center support and over said intermediate connector section, whereby the portion of said center cable which is wound around said center cable support also passes over said cable connector retaining the latter in place on said center cable support.

2. A cable reel assembly according to claim 1 wherein said connector includes means for allowing relative pivotal movement between said outer cables and said center cable about the elongated portion of said connector.

3. A cable reel assembly according to claim 1 wherein the diameter of said cylindrical outer cable supports are substantially equal and less than the diameter of said cylindrical center cable support.

4. A cable reel assembly according to claim 1 wherein said center cable support includes a slot extending across the entire axial length thereof and extending inwardly from an outer circumferential portion thereof, said assembly further including:
   a. a first circumferential divider coaxial with and positioned between said first outer cable support and said center cable support and extending outwardly from said last-mentioned supports, said divider including a slot extending across the entire axial length thereof and inwardly from an outer circumferential portion thereof, said second-mentioned slot being in alignement with said first-mentioned slot, and
   b. a second circumferential divider coaxial with and positioned between said second outer cable support and said center cable support and extending outwardly from said last-mentioned supports, said second divider including a slot extending across the entire axial length thereof and inwardly from an outer circumferential portion thereof, said last-mentioned slot being in alignment with said first and second mentioned slots.

5. A cable reel assembly according to claim 4 including:
   a. means positioned within said first-mentioned slot for supporting said cable connector in an unconnected fashion within the slot defined by said center support.

6. A cable reel assembly according to claim 1 wherein the elongated portion of said cable connector comprises a pivot pin and wherein said connector further includes two elongated outer cable connector means respectively affixed at common ends to opposite end sections of said pivot pin and an elongated center cable connector means connected at one end for pivotal movement with the intermediate section of said pivot pin, all of said connector means extending outwardly from said pivot pin and being connected at their free ends with respective ones of said cables.

7. A cable reel assembly according to claim 1 including:
   a. two support wheels coaxial with and respectively connected with said first and second outer cable supports, each of said wheels including a hub portion, a rim portion and a plurality of spokes connected with said hub portion and said rim portion, each of said spokes being substantially T-shaped in cross section.

8. A cable reel comprising:
   a. a first outer cable support including a first annular cable support surface;
   b. a second outer cable support including a second annular cable support surface coaxial with and spaced apart from said first surface;
   c. a center cable support connected with said outer supports and including an intermediate annular cable support surface coaxial with and positioned between said first and second support surfaces;
   d. a first divider connected with and on one side of said center cable support and including a first outermost annular surface coaxial with and positioned between said first and intermediate cable support surfaces, said outermost surface having a greater diameter than said cable support surfaces and including an inwardly directed slot extending axially entirely across a portion of said outermost surface; and
   e. a second divider connected with and on the other side of said center cable support and including a second outermost annular surface coaxial with and positioned between said second and intermediate cable support surfaces, said second outermost surface having a greater diameter than said cable support surfaces and including an inwardly directed slot extending axially entirely acorss a portion of said second outermost surface and aligned with said first-mentioned slot.

9. A cable reel according to claim 8 wherein said intermediate cable support surface has a greater diameter than said first and second cable support surfaces, said intermediate surface including an inwardly directed slot extending axially entirely across a portion thereof and aligned with the slots in said outermost surfaces.

10. A cable reel according to claim 9 wherein said center cable support includes a cable connector support positioned within the slot in said intermediate surface and extending outwardly from one wall defining said lastmentioned slot.

* * * * *